Oct. 6, 1931. J. A. BUTKUS 1,826,421
FURNITURE CORNER CONSTRUCTION
Filed Aug. 24, 1927 3 Sheets-Sheet 1
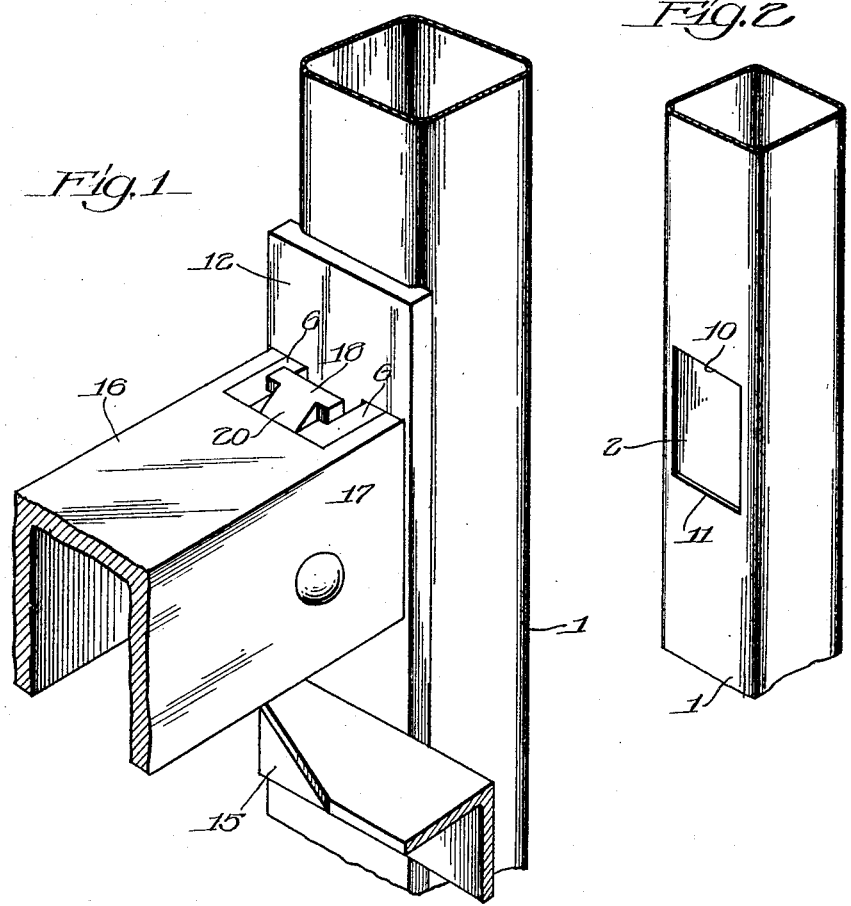
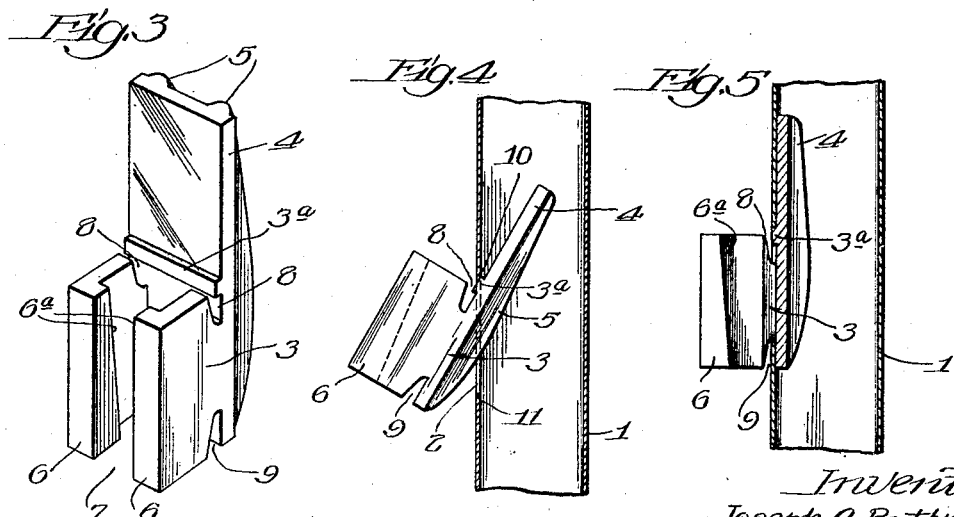

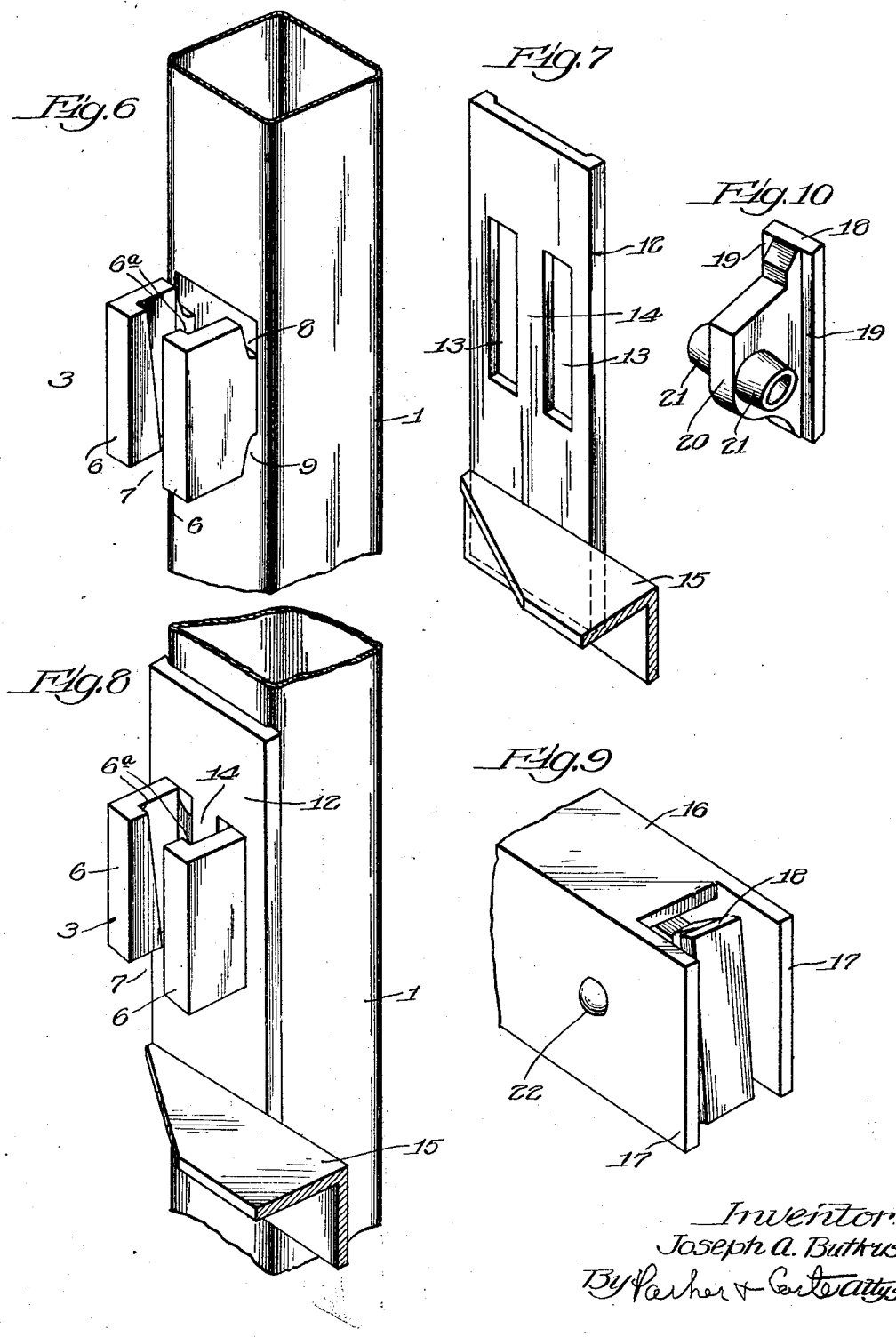

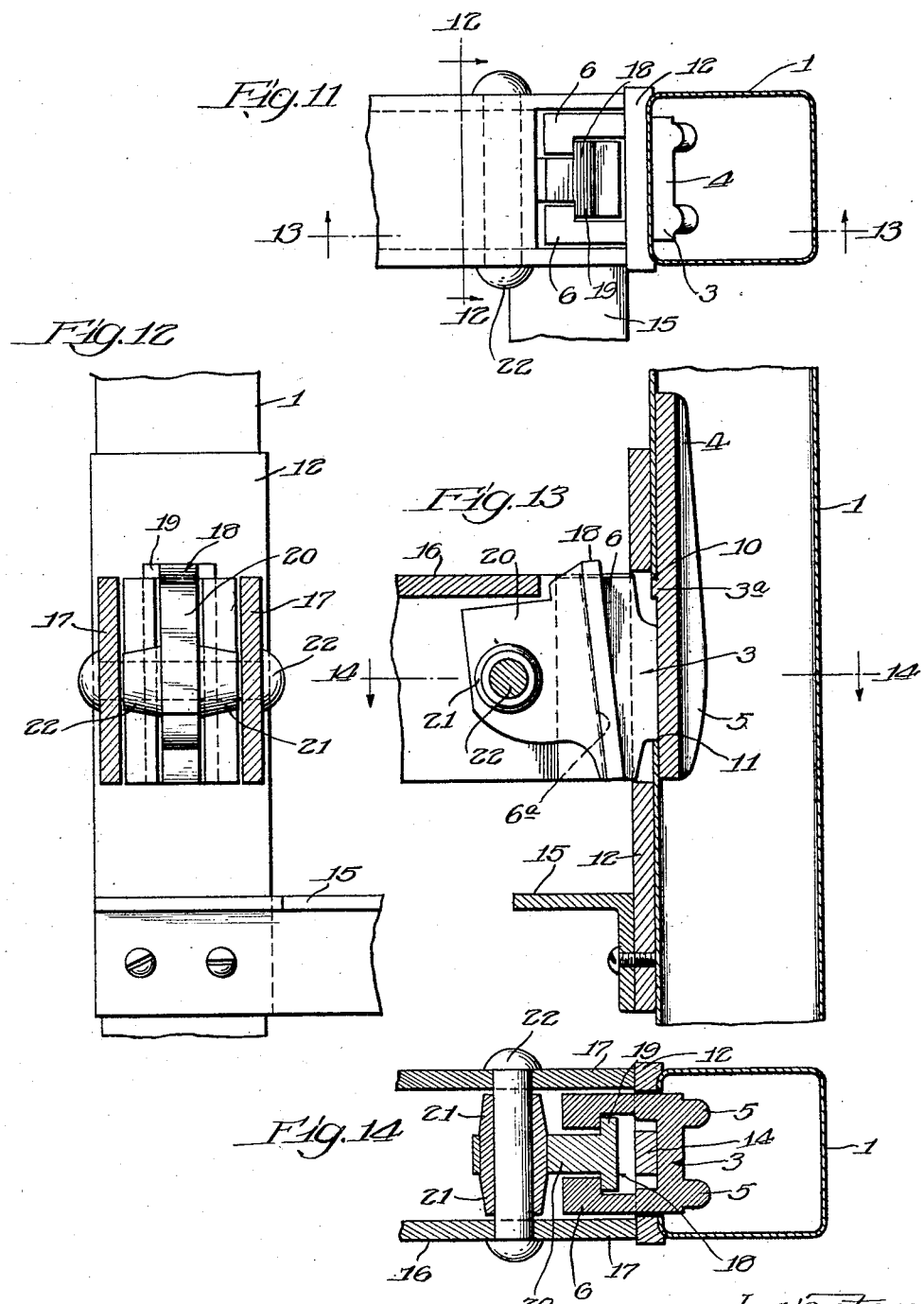

Patented Oct. 6, 1931

1,826,421

UNITED STATES PATENT OFFICE

JOSEPH A. BUTKUS, OF CHICAGO, ILLINOIS, ASSIGNOR TO GUSTAVUS A. E. KOHLER, OF CHICAGO, ILLINOIS

FURNITURE CORNER CONSTRUCTION

Application filed August 24, 1927. Serial No. 215,078.

This invention relates to improvements in furniture corner construction and has for its object to provide a new and improved device of this description.

The invention has as a further object to provide a corner construction for furniture wherein the principal parts may be of cast metal and which may be easily and quickly assembled and disassembled without the necessity of inserting any of the parts into the end of the support.

The invention has as a further object to provide a furniture corner construction with few parts easily assembled.

The invention has further objects which are more particularly pointed out in the accompanying description.

Referring now to the drawings, Fig. 1 is a perspective view of one form of device embodying the invention.

Fig. 2 is a perspective view of one of the supports before the other members are connected therewith.

Fig. 3 is a perspective view of the support connecting member.

Fig. 4 is a view of a portion of the support in section showing the method of connecting the support connecting member therewith.

Fig. 5 is a view similar to Fig. 4 with the support connecting member in position.

Fig. 6 is a perspective view of a portion of the support connecting member in position.

Fig. 7 is a perspective view of the cross bar connecting member.

Fig. 8 is a perspective view of a portion of the support with the support connecting member and cross bar connecting member in position.

Fig. 9 is a perspective view of the rail connecting member.

Fig. 10 is a perspective view of the clamping device of the rail connecting member.

Fig. 11 is a plan view of the device shown in Fig. 1.

Fig. 12 is a sectional view taken on line 12—12 of Fig. 11.

Fig. 13 is a sectional view taken on line 13—13 of Fig. 11.

Fig. 14 is a sectional view taken on line 14—14 of Fig. 13.

Like numerals refer to like parts throughout the several figures.

Referring now to the drawings, I have shown a corner support 1 of metal. This support is hollow and is provided at one side with an opening 2. A support connecting member 3 is removably connected with the support 1 by having a part thereof inserted through the opening 2. This support connecting member has the longitudinally extending part 4 which engages the inner face of the support. This member is provided with strengthening ribs 5. The support connecting member is provided with the projecting engaging parts 6 which project beyond the support and which are separated by a space 7 to receive the rail connecting member hereinafter described. The projecting engaging parts 6 are provided at the top with the slots 8 and at the bottom with the slots 9. The slots 8 receive the edge 10 of the support at the top of the opening 2 when the support connecting member is being placed in position. The slots 9 receive the edge 11 of the support at the bottom of the opening 2 when the support connecting member is in position.

In placing the support connecting member in position, the longitudinally extending part 4 is inserted in the opening 2 as shown in Fig. 4 and the member moved up so that the edge 10 enters the slots 8. The bottom of the member can then be moved inwardly and lowered as shown in Fig. 5, the edge 11 of the support entering the slots 9. The projecting engaging parts 6 are provided with the inclined engaging faces 6a. When the support connecting member is in position, as shown in Fig. 6, the cross bar connecting member is placed in position. This cross bar connecting member consists of a plate 12 which engages the outer face of the support 1. This plate is provided with the openings 13 on opposite sides of the central part 14. Attached to the plate 12 is the cross bar 15. This cross bar connecting member is shown in position in Fig. 8.

In this construction the rail 16 is channel shaped and has a portion thereof which connects the side pieces at one end, removed as shown in Fig. 9. The ends 17 of these side pieces engage the plate 12. Pivotally connected between the side pieces of the rail is the clamping device 18. This clamping device is provided at its rear with the engaging faces 19 on opposite sides of the body portion 20. Projecting laterally from the body portion are the pivot receiving parts 21 which centrally locate the clamping device between the side pieces of the rail 16. The clamping device 18 is inserted between the projecting engaging parts 6 and moved downwardly, the engaging faces 19 thereof engaging the engaging faces 6a. The ends 17 of the rail engage the plate 12, the parts being in the position shown in Figs. 11, 12, 13, and 14.

The use and operation of my invention are as follows. When it is desired to assemble the device, the longitudinally extending part 4 of the support connecting member 3 is inserted in the opening 2 of the support 1, as shown in Fig. 4, and is lifted upwardly so that the edge 10 of the support enters the slots 8. The lower end of the support connecting member is then moved inwardly and said member then moved downwardly so that the edge 11 of the support enters the slots 9, as shown in Fig. 5. The cross bar connecting member is then placed in position by causing the projecting engaging parts 6 to pass through the openings 13 of the plate 12, said plate 12 being brought into engagement with the face of the support as shown in Fig. 8. The clamping device 18 is then inserted between the projecting parts 6 and moved downwardly until the parts take the position shown in Figs. 11 to 14 inclusive. It will be seen that due to the inclined engaging faces, a wedging action is secured which causes the joint to tighten by a weight placed upon the rail. The joint is, therefore, made more secure by the weight placed upon it. The pivotal connection of the clamping piece permits it to move to the proper inclined position to engage the inclined faces 6a on the projecting engaging parts 6 of the support connecting member.

When it is desired to disassemble the parts, the rail 16 is moved upwardly to remove the clamping device from between the projecting engaging parts 6 of the support connecting member.

It will thus be seen that I have here a simple, cheap and effective construction for furniture which has few parts easily assembled and of a strong and durable construction.

I claim:

1. A corner construction for furniture comprising a hollow support, having an opening in the side thereof, a removable support connecting member adapted to be inserted through said opening and having two projecting engaging parts projecting outwardly therefrom, a cross bar connecting member engaging said support and supported by said support connecting member a rail provided with side pieces, a clamping device connected to the side pieces of said rail and received between the projecting engaging parts of the support connecting member, said clamping device and projecting engaging parts of the support connecting member having engaging faces.

2. A corner construction for furniture comprising a hollow support, having an opening in the side thereof, a removable support connecting member adapted to be inserted through said opening and having two projecting engaging parts projecting outwardly therefrom, a cross bar connecting member engaging said support and supported by said support connecting member a rail provided with side pieces, a clamping device connected to the side pieces of said rail and received between the projecting engaging parts of the support connecting member, said clamping device and projecting engaging parts of the support connecting member having engaging faces, said clamping device pivotally connected with the side pieces of said rail.

3. A furniture corner construction comprising a hollow support having an opening in one side, a support connecting member having a part adapted to be inserted through said opening and which engages the inner face of said support, two separated projecting engaging parts connected with said support connecting member, a rail, a clamping device directly and movably connected with said rail and adapted to be received between said projecting engaging parts, said clamping device and said projecting engaging parts having inclined engaging faces, a cross bar connecting member supported by said support connecting member and held against outward movement by said rail.

4. A furniture corner construction comprising a hollow support having an opening in one side, a support connecting member having a part adapted to be inserted through said opening and which engages the inner face of said support, two separated projecting engaging parts connected with said support connecting member, a rail, a clamping device directly connected with said rail and adapted to be received between said projecting engaging parts, said clamping device and said projecting engaging parts having engaging faces, said clamping device pivotally connected with said rail.

5. A furniture corner construction comprising a support having an opening in one side, a support connecting member projecting from said opening, a plate engaging said support on the side provided with said opening and separate from the support, a support connecting member projecting through said plate, a cross bar connected with said plate, a rail extending at an angle to said bar and having its end abutting said plate, said rail provided with an opening into which the support connecting member projects, and a separate connecting piece for connecting said rail and support connecting member together, said separate connecting piece being pivotally connected with said rail.

Signed at Chicago, county of Cook and State of Illinois, this 28th day of May, 1927.

JOSEPH A. BUTKUS.